United States Patent
Newham et al.

(10) Patent No.: US 9,088,406 B2
(45) Date of Patent: Jul. 21, 2015

(54) FRAME SYNC ACROSS MULTIPLE CHANNELS

(75) Inventors: Adam E. Newham, Poway, CA (US); Joel Benjamin Linsky, San Diego, CA (US); Rohit Sauhta, San Diego, CA (US); Brian F. Miller, San Diego, CA (US); Kevin Wayne Bartig, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 13/561,077

(22) Filed: Jul. 29, 2012

(65) Prior Publication Data

US 2014/0029701 A1  Jan. 30, 2014

(51) Int. Cl.
| | |
|---|---|
| G06F 9/26 | (2006.01) |
| H04L 7/04 | (2006.01) |
| H04J 3/06 | (2006.01) |
| H04S 1/00 | (2006.01) |

(52) U.S. Cl.
CPC ............... *H04L 7/041* (2013.01); *H04J 3/0652* (2013.01); *H04S 1/005* (2013.01); *H04R 2420/07* (2013.01)

(58) Field of Classification Search
CPC .......... G06F 12/0238; G06F 17/30156; G06F 12/1018
USPC ............................................ 700/94; 711/216
See application file for complete search history.

(56) References Cited

U.S. PATENT DOCUMENTS

| | | | |
|---|---|---|---|
| 7,573,868 | B2 | 8/2009 | Cutler et al. |
| 7,996,496 | B2 | 8/2011 | Haartsen et al. |
| 7,996,571 | B2 | 8/2011 | Salokannel |

(Continued)

FOREIGN PATENT DOCUMENTS

| | | |
|---|---|---|
| WO | WO-2008113053 A1 | 9/2008 |
| WO | WO-2009059899 A1 | 5/2009 |

(Continued)

OTHER PUBLICATIONS

Jian H., et al., "Point-to-Multipoint Stereo Audio Transmitting System Based on Bluetooth", Communications and Mobile Computing (CMC), 2010 International Conference on, IEEE, Piscataway, NJ, USA, Apr. 12, 2010, pp. 323-328, XP031680609, ISBN: 978-1-4244-6327-5 abstract; figures 4-6 p. 326, left-hand column, paragraph 1-right-hand column, paragraph 1 p. 327, left-hand column, paragraph 2-right-hand column, paragraph 2.

(Continued)

*Primary Examiner* — Creighton Smith

(57) ABSTRACT

Systems, methods, and devices synchronize data streams by hashing received data frames to generate a sequence of hash values, comparing the generated hash value sequence to a hash value sequence received in a control stream, and processing data frames when the hash value sequences match. A source device and multiple receiver devices may synchronize audio data encoded in data frames, applying a hash function to each data frame to generate a first sequence of hash values, transmitting the data frames on a first channel and the first sequence of hash values on a control channel, receiving the data frames and the first sequence of hash values in the receiver devices, applying the hash algorithm to received data frames to generate a second sequence of hash values, comparing the first and second sequences of hash values, and processing data frames when the first and second sequences of hash values match.

60 Claims, 10 Drawing Sheets

(56) References Cited

U.S. PATENT DOCUMENTS

| | | |
|---|---|---|
| 2002/0071477 A1 | 6/2002 | Orava |
| 2007/0172011 A1 | 7/2007 | Kumar et al. |
| 2008/0076489 A1 | 3/2008 | Rosener et al. |
| 2008/0291863 A1 | 11/2008 | Agren |
| 2009/0274326 A1 | 11/2009 | Jia et al. |
| 2009/0298420 A1 | 12/2009 | Haartsen et al. |
| 2010/0240345 A1 | 9/2010 | Karrman et al. |
| 2010/0305729 A1 | 12/2010 | Glitsch et al. |
| 2011/0059769 A1 | 3/2011 | Brunolli |
| 2011/0202156 A1 | 8/2011 | Glitsch et al. |
| 2011/0231565 A1 | 9/2011 | Gelter et al. |
| 2012/0044062 A1 | 2/2012 | Jersa et al. |
| 2012/0260060 A1* | 10/2012 | Hwang et al. ............... 711/216 |
| 2013/0326114 A1* | 12/2013 | Goss et al. ............... 711/103 |
| 2013/0326115 A1* | 12/2013 | Goss et al. ............... 711/103 |

FOREIGN PATENT DOCUMENTS

| | | |
|---|---|---|
| WO | WO-2009137460 | 11/2009 |
| WO | WO-2009144537 A1 | 12/2009 |

OTHER PUBLICATIONS

Partial International Search Report—PCT/US2013/052359—ISA/EPO—Dec. 11, 2013.

International Search Report and Written Opinion—PCT/US2013/052359—ISA/EPO—Jul. 1, 2014.

Dosh I, "Experimental Investigation of Audio and Video Quality in Multi-Video Streaming Environments," Thesis submitted to University of Illinois at Urbana-Champaign, 2006, 73 pages.

Taiwan Search Report—TW102127192—TIPO—Jan. 15, 2015.

* cited by examiner

FRAME SYNC ACROSS MULTIPLE CHANNELS

BACKGROUND

Wireless communication technologies have improved over the past several years. Wireless local area networks are now replacing wired networks in many homes and offices. Short-range wireless technologies, such as Bluetooth® and WiFi, enable high-speed communications between mobile electronic devices (e.g., cellular phones, speakers, watches, headphones, remote controls, etc.) that are within a relatively short distance of one another (e.g., 100 meters or less). As these technologies continue to improve and grow in popularity, short-range wireless technologies are expected to supplant or replace the need for connecting devices together using cables or wires.

SUMMARY

The various embodiments include systems, methods, and devices configured to synchronize data streams within a communication system.

The various embodiments may include methods of processing a data stream within a receiver device, including receiving a sequence of data frames in a receiver device via a first wireless communication link, applying a hash algorithm to the received data frames to generate a first sequence of hash values, receiving a control stream including a second sequence of hash values, comparing the first and second sequences of hash values, and determining when to begin processing received data frames based upon when the first and second sequences of hash values match. In an embodiment, determining when to begin processing received data frames based upon when the first and second sequences of hash values match may include beginning to process audio data frames in order to generate sound, and the receiver device may be one of a plurality of wireless speaker devices. In an embodiment, the sequence of data frames may include an audio data stream, receiving a control stream including a second sequence of hash values may include receiving a control stream that includes timestamp information, and determining when to begin processing received data frames based upon when the first and second sequences of hash values match may include determining when to begin decoding the audio data stream when the timestamp information matches a network clock signal. In an embodiment, the sequence of data frames may be an audio data stream, receiving a control stream including a second sequence of hash values may include receiving a control stream that includes clock information, and determining when to begin processing received data frames based upon when the first and second sequences of hash values match may include determining when to begin decoding the audio data stream based upon the received clock information and a network clock. In an embodiment, the method may further include storing the received data frames in a buffer, and generating a new second sequence of hashes based on the most recently received data frames stored in the buffer when the first and second sequences of hash values do not match. In an embodiment, applying a hash algorithm to the received data frames may include applying a cyclic redundancy check to the received data frames, or applying a forward error correction algorithm to the received data frames. In an embodiment, comparing the first and second sequences of hash values may include comparing a hash value for each received data frame to determine when there is a match, and/or comparing a sequence of hash values spanning a plurality of data frames to determine when a pattern of hash values match. In an embodiment, the control stream may be transmitted as part of the first wireless communication link, in which case receiving a control stream including a second sequence of hash values may include receiving the control stream from the first wireless communication link. Alternatively, the control stream may be transmitted via a second wireless communication link different from the first wireless communication link, in which case receiving a control stream including a second sequence of hash values may include receiving the control stream from the second wireless communication link.

The various embodiments may also include methods of synchronizing audio data transmitted by a source device to multiple receiver devices, including encoding audio data into a sequence of data frames, applying a hash function to each of the data frames to generate a first sequence of hash values, transmitting the data frames on a first channel, transmitting the first sequence of hash values on a control channel, receiving the data frames and the first sequence of hash values in each of the multiple receiver devices, applying the hash algorithm in each of the multiple receiver devices to the received data frames to generate a second sequence of hash values, comparing the first and second sequences of hash values in each of the multiple receiver devices, and beginning to process received data frames in each of the multiple receiver devices when the first and second sequences of hash values match. In an embodiment the multiple receiver devices may be first and second speaker devices, and beginning to process received data frames in each of the multiple receiver devices when the first and second sequences of hash values match may include beginning to decode the data frames in each of the first and second speaker devices so that audio is generated by the first and second speaker devices that is synchronized within a single 48 KHz sample. In an embodiment, transmitting the first sequence of hash values on a control channel may include transmitting the first sequence of hash values on a control channel as part of a wireless communication link that also transmits the first channel. In an embodiment, transmitting the first sequence of hash values on a control channel may include transmitting the first sequence of hash values on a control channel via a wireless communication link that is different from the first channel.

The various embodiments may further include methods of synchronizing audio output by a first wireless receiver device and a second wireless receiver device based on an audio signal including a first sequence of data frames including a first audio channel and a second audio channel, including receiving the audio signal as a first sequence of data frames in the first wireless receiver device over a first Bluetooth® communication link, aligning the received first sequence of data frames to a clock of the first wireless receiver device, sending at least the second audio channel portion of the audio signal as a second sequence of data frames from the first wireless receiver device to the second wireless receiver device over a second Bluetooth® communication link, the second Bluetooth® communication link including a Bluetooth® clock signal, receiving the second sequence of data frames in the second wireless receiver device, and aligning the received second sequence of data frames to a clock of the second wireless receiver device using the Bluetooth® clock signal in the second Bluetooth® communication link so that the second audio channel in the second wireless receiver device is aligned to within 20 us of the first audio channel. In an embodiment, aligning the received aligned sequence of data frames to a clock of the second wireless receiver device using the Bluetooth® clock signal in the second Bluetooth® communication link may include decoding the received second sequence of data frames, storing the decoded frames as audio samples in a buffer of the second wireless receiver device, determining if an accumulated error between the clock of the second wireless receiver and the Bluetooth® clock requires a corresponding correction to the audio samples, and adding or removing audio samples from the buffer in response to determining that the accumulated error between the clock of the second wireless receiver and the Bluetooth® clock requires a corresponding correction to the audio samples. In a further embodiment, sending at least the second audio channel portion of the audio signal as a second sequence of data frames from the first wireless receiver device to the second wireless receiver device may include relaying the audio signal including the first audio channel and the second audio channel.

A further embodiment may include a communication device that includes a memory and a processor configured with processor executable instructions to perform operations of the methods described above.

A further embodiment may include a communication system that includes a wireless data source device and a plurality of receiver devices, in which the wireless data source device includes a wireless transceiver and a processor configured to perform operations of the methods described above, and the plurality of receiver devices each include a receiver circuit (e.g., a radio or wireless transceiver) and processor configured to perform operations of the methods described above.

A further embodiment may include a communication system including means for performing functions of the operations of the methods described above.

A further embodiment may include a non-transitory processor-readable storage medium having stored thereon processor-executable instructions configured to cause processors of a wireless data source device and receiver devices to perform operations of the methods described above.

Further embodiments may include a communication system that includes a first wireless receiver device having a first Bluetooth® transceiver, a second wireless receiver device having a second Bluetooth® transceiver, means for receiving an audio signal as a first sequence of data frames in the first wireless receiver device over a first Bluetooth® communication link, means for aligning the received first sequence of data frames to a clock of the first wireless receiver device, means for sending at least the second audio channel portion of the audio signal as a second sequence of data frames from the first wireless receiver device to the second wireless receiver device over a second Bluetooth® communication link, the second Bluetooth® communication link including a Bluetooth® clock signal, means for receiving the second sequence of data frames in the second wireless receiver device, and means for aligning the received second sequence of data frames to a clock of the second wireless receiver device using the Bluetooth® clock signal in the second Bluetooth® communication link so that the second audio channel in the second wireless receiver device is aligned to within 20 us of the first audio channel. In an embodiment, aligning the received aligned sequence of data frames to a clock of the second wireless receiver device using the Bluetooth® clock signal in the second Bluetooth® communication link may include means for decoding the received second sequence of data frames, means for storing the decoded frames as audio samples in a buffer of the second wireless receiver device, means for determining if an accumulated error between the clock of the second wireless receiver and the Bluetooth® clock requires a corresponding correction to the audio samples, and means for adding or removing audio samples from the buffer in response to determining that the accumulated error between the clock of the second wireless receiver and the Bluetooth® clock requires a corresponding correction to the audio samples. In a further embodiment, means for sending at least the second audio channel portion of the audio signal as a second sequence of data frames from the first wireless receiver device to the second wireless receiver device may include means for relaying the audio signal including the first audio channel and the second audio channel.

Further embodiments may include a communication system that includes a first wireless receiver device having a first Bluetooth® transceiver, a first memory, and a first processor coupled to the first Bluetooth® transceiver and the first memory, and a second wireless receiver device having a second Bluetooth® transceiver, a second memory, and a second processor coupled to the second Bluetooth® transceiver and the second memory. In this embodiment, the first processor may be configured with processor-executable instructions to perform operations including receiving via the first Bluetooth® transceiver an audio signal including a first sequence of data frames including a first audio channel and a second audio channel over a first Bluetooth® communication link, aligning the received first sequence of data frames to a clock of the first wireless receiver device, and sending at least the second audio channel portion of the audio signal as a second sequence of data frames to the second wireless receiver device over a second Bluetooth® communication link, in which the second Bluetooth® communication link including a Bluetooth® clock signal. Also in this embodiment, the second processor may be configured with processor-executable instructions to perform operations including receiving the second sequence of data frames via the second Bluetooth® transceiver, and aligning the received second sequence of data frames to a clock of the second wireless receiver device using the Bluetooth® clock signal in the second Bluetooth® communication link so that the second audio channel in the second wireless receiver device is aligned to within 20 us of the first audio channel. In an embodiment, the second processor may be configured with processor-executable instructions to perform operations such that aligning the received aligned sequence of data frames to a clock of the second wireless receiver device using the Bluetooth® clock signal in the second Bluetooth® communication link may include decoding the received second sequence of data frames, storing the decoded frames as audio samples in the second memory, determining if an accumulated error between the clock of the second wireless receiver and the Bluetooth® clock requires a corresponding correction to the audio samples, and adding or removing audio samples from the buffer in response to determining that the accumulated error between the clock of the second wireless receiver and the Bluetooth® clock requires a corresponding correction to the audio samples. In a further embodiment, the first processor may be configured with processor-executable instructions to perform operations such that sending at least the second audio channel portion of the audio signal as a second sequence of data frames to the second wireless receiver device may include relaying the audio signal including the first audio channel and the second audio channel.

Further embodiments include a non-transitory computer readable storage medium having stored thereon processor-executable software instructions configured to cause a processor of a Bluetooth® receiver device to perform operations for synchronizing with another Bluetooth® receiver device audio output based on an audio signal including a first sequence of data frames including a first audio channel and a second audio channel, including functioning as a master device in a Bluetooth® piconet. The stored processor-executable software instructions may include instructions for performing operations including receiving the audio signal as a first sequence of data frames over a first Bluetooth® communication link, aligning the received first sequence of data frames to a clock of the wireless receiver device, and sending at least the second audio channel portion of the audio signal as a second sequence of data frames to a slave wireless receiver device over a second Bluetooth® communication link, the second Bluetooth® communication link including a Bluetooth® clock signal, and functioning as a slave device in a Bluetooth® piconet by performing operations including receiving the second sequence of data frames from a master wireless receiver device, and aligning the received second sequence of data frames to a clock of the wireless receiver device using the Bluetooth® clock signal in the second Bluetooth® communication link so that the second audio channel in the wireless receiver device is aligned to within 20 us of the first audio channel. In an embodiment, the stored processor-executable software instructions may be configured to cause a processor of a Bluetooth® receiver device to perform operations such that aligning the received aligned sequence of data frames to a clock of the wireless receiver node using a clock provided in the second Bluetooth® communication link may include decoding the received second sequence of data frames, storing the decoded frames as audio samples in a buffer, determining if an accumulated error between the clock of the second wireless receiver and the Bluetooth® clock requires a corresponding correction to the audio samples, and adding or removing audio samples from the buffer in response to determining that the accumulated error between the clock of the second wireless receiver and the Bluetooth® clock requires a corresponding correction to the audio samples. In a further embodiment, the stored processor-executable software instructions may be configured to cause a processor of a Bluetooth® receiver device to perform operations such that sending at least the second audio channel portion of the audio signal as a second sequence of data frames to a slave wireless receiver device may include relaying the audio signal including the first audio channel and the second audio channel.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
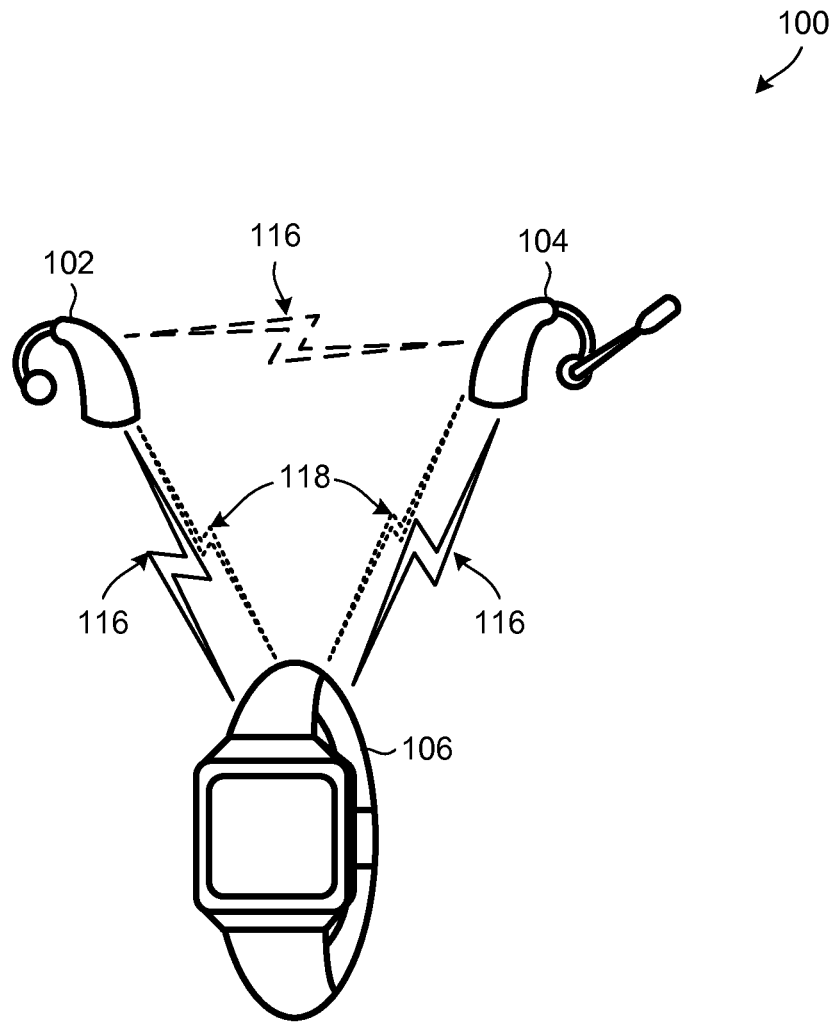
FIG. 1 is a component block diagram illustrating example components and communication links in a composite electronic device suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The term "computing device" is used generically herein to refer to any one or all of servers, personal computers, laptop computers, tablet computers, mobile devices, cellular telephones, smartbooks, ultrabooks, palm-top computers, personal data assistants (PDA's), wireless electronic mail receivers, multimedia Internet-enabled cellular telephones, Global Positioning System (GPS) receivers, wireless gaming controllers, and other similar electronic devices that include a programmable processor and circuitry for wirelessly sending or receiving information.

The terms "wireless device" and "wireless node" are used herein to refer to any electronic device that includes circuitry for wirelessly sending and/or receiving information, and may include any one or all of cellular telephones, personal or mobile multi-media players, watches, wrist displays, medical devices, headsets, headphones, speakers, microphones, and other similar electronics.

The term "Bluetooth®-enabled device" is used herein to refer to any electronic device that includes a radio frequency (RF) radio and a processor or circuitry for implementing the Bluetooth® protocol stack/interface. Bluetooth® is an open standard for short-range radio frequency (RF) communications. Details of the Bluetooth® standards, interfaces, and technology are set forth in Bluetooth® Special Interest Group (SIG) Specification of the Bluetooth® System Version 4.0 Jun. 30, 2010, which is herein incorporated by reference in its entirety.

As mobile device and wireless technologies continue to improve and grow in popularity, short-range wireless technologies are expected to supplant or replace the need for connecting devices together using cables or wires. However, providing stereo sound to wireless audio receiver devices (e.g., wireless bookshelf speakers, headphones, etc.) over a wireless communications link presents unique challenges not addressed by existing solutions.

In order to provide users with a full stereophonic sound experience (e.g., spatial depth, directionality, etc.), the left and right audio signals must be coordinated so that the sound generated in each ear are received at precise times. The signals must be sufficiently spaced to create an intended stereo or surround sound effect, but not so much that the signal delays are recognizable to human ears. Since an average human ear is capable of recognizing ear-to-ear delays of around 12-18 μs, a sampling frequency of around 48 KHz or better may be required to provide users with an optimal stereo sound experience. That is, providing users with a full stereophonic sound experience may require that the left and right audio signals be generated within a single 48 KHz sample. This may be accomplished by, for example, synchronizing the left and right audio streams so that the sounds produced by the corresponding speakers reach the user at an acceptable time (e.g., within a computed range or time window). However, such synchronization of audio streams is difficult on wireless systems having multiple independent audio receiver nodes.

A typical wireless system includes a wireless audio source device (e.g., media player) that sends audio information embedded in data frames/packets to two or more wireless audio receiver devices (e.g., left and right speakers) over a wireless air interface. The frames/packets may be transmitted to the audio receiver devices through separate left and right communication channels, each of which may experience different propagation delays or transmission errors that result in each speaker (e.g., left and right) receiving the signal at different times. Since the wireless audio receiver devices are independent, they typically do not share any hardware (e.g., a common clock) that may be used to synchronize the streams of data. Therefore, it is difficult for the wireless receiver devices to synchronize the signals so that the audio playback from both left and right speakers or earpieces are generated within the narrow left/right synchronization tolerance that is required for optimal stereo sound and a satisfactory user experience.

The various embodiments provide methods for synchronizing a plurality of wireless audio streams on wireless audio receiver devices in order to generate sounds that reach the user within the narrow ranges required for satisfying human perception requirements. Synchronization may be performed independently at each wireless receiver node by comparing hashes calculated from frames of an audio stream with one or a sequence of hashes provided to the receiver node in a separate control stream by the audio source. The wireless receiver nodes may decode and render the audio in response to determining that the hashes calculated from the received audio frames match the hashes received in the control stream.

Various embodiments are described herein using Bluetooth® and Bluetooth®-related terminology as a convenient example of a communication technology for wirelessly connecting electronic devices located within a relatively short distance of one another (e.g., 100 meters). However, examples referring to Bluetooth®, and other references to the Bluetooth® herein, are for illustration purposes only and are not intended to limit the descriptions or the claims to that particular standard. Therefore, the scope of the claims should not be construed as requiring Bluetooth® technology unless specifically recited as such in the claims.

Bluetooth® technology provides a secure way to connect and exchange information between electronic devices (e.g., headphones, cellular phones, watches, laptops, remote controls, etc.). Bluetooth® communications may require establishing wireless personal area networks (also referred to as "ad hoc" or "peer-to-peer" networks). These ad hoc networks are commonly called "piconets." Each device may belong to multiple piconets. Multiple interconnected piconets may be called "scatternets." A scatternet may be formed when a member of a first piconet elects to participate in a second piconet.

A Bluetooth® profile describes general behaviors through which Bluetooth®-enabled devices communicate with other Bluetooth® devices. For example, the advanced audio distribution profile (A2DP) is a Bluetooth® profile that enables the creation of a Bluetooth® channel through which advanced audio data may be streamed from one Bluetooth®-enabled device to another Bluetooth®-enabled device. A2DP defines a source role (SRC) and a sink role (SNK) for the Bluetooth®-enabled devices, in which devices that operate in the source role (SRC) are responsible for transmitting digital-audio data and devices that operate in the sink role (SNK) are responsible for receiving a digital-audio stream.

FIG. 1 is a component block diagram illustrating an example wireless system 100 suitable for implementing the various embodiments. In the illustrated example of FIG. 1, the wireless system 100 includes a left earpiece 102, a right earpiece 104, and a wrist display 106, each of which may be independently Bluetooth® enabled. Each wireless component 102, 104, 106 may be individually paired to each of the other components via wireless communication links/pairings 116, although in some embodiments the earpieces 102, 104 may not communicate with each other. In an embodiment, the wireless communication link 116 between the wrist display 106 and each of the earpieces 102, 104 may include or be supplemented by a command channel 118. In various embodiments, the command channel 118 may be a separate communication channel, or may be a portion of or share the main wireless communication link 116 over which media data are communicated. In an embodiment, the components 102, 104, 106 may be coupled together in an advanced audio distribution profile (A2DP) configuration. For example, the wrist display 106 may operate as a source (SRC) and the left and right earpieces 102, 104 may operate as sinks (SNK).

The wrist display 106 may include a media player for generating audio data, an encoder for encoding the audio data into audio data packets, and a transmitter for wirelessly transmitting audio streams to the earpieces 102, 104. The earpieces 102, 104 may include a receiver for receiving wireless audio streams, a decoder for decoding the received audio streams into audio data, and a speaker for generating sounds based on the audio data received from the wrist display 106, another earpiece 104, 102, or a third party device (e.g., a cellphone, media player, television, etc.)

In an embodiment, the wrist display 106 may be configured to transmit an audio data stream and/or a control stream to each of the earpieces 102, 104. In an embodiment, the control stream may be transmitted as part of the wireless communication channel (e.g., an overhead component) that carries the audio data packets. In another embodiment, the control stream may be transmitted via a separate out-of-band channel (i.e., different from the wireless communication channel that carries the audio data packets). In an embodiment, the wrist display 106 may transmit audio and/or control streams to a first earpiece (e.g., a left earpiece 102), which may receive the wireless transmissions and relay them to a second earpiece (e.g., a right earpiece 104).

Figure 2:
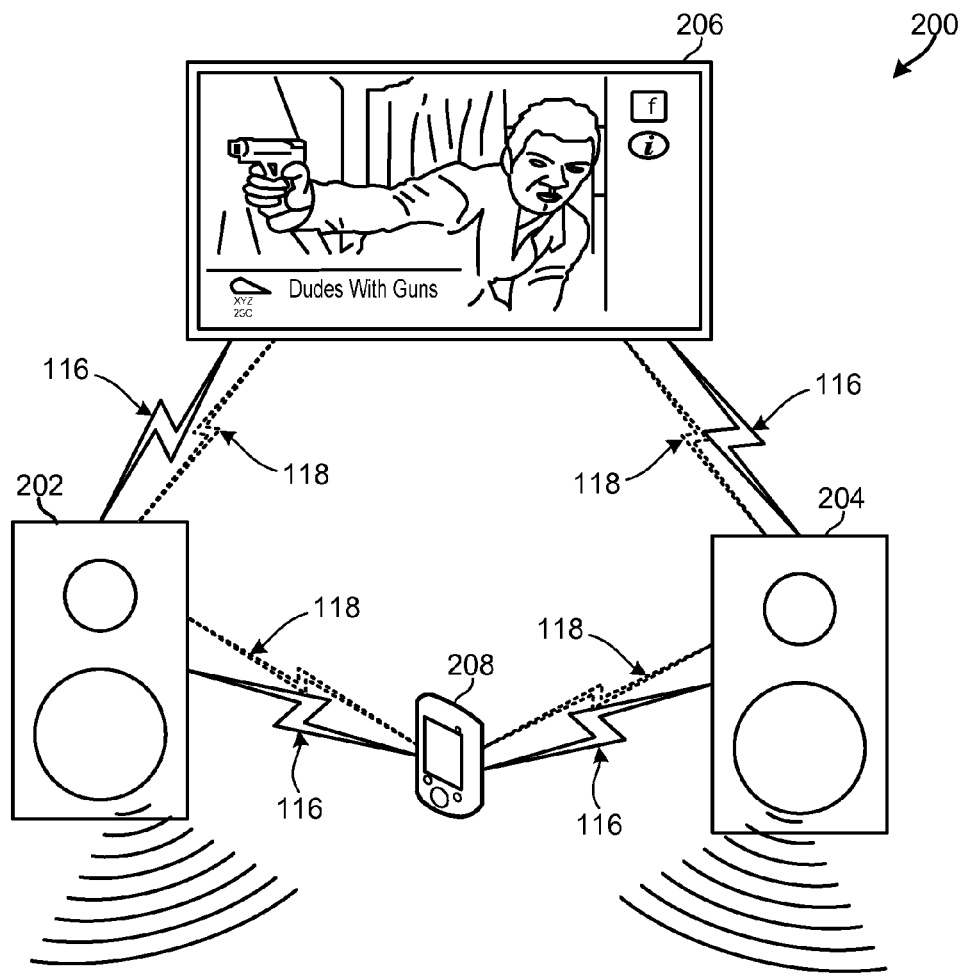
FIG. 2 is a component block diagram illustrating another example wireless communication system suitable for implementing the various embodiments.

FIG. 2 is a component block diagram illustrating another example wireless system 200 suitable for implementing the various embodiments. In the example illustrated in FIG. 2, the wireless system 200 includes a left wireless speaker 202, a right wireless speaker 204, and a media source, such as a television 206 and/or a stereo audio source 208, each of which may be independently Bluetooth® enabled. The media source 206, 208 may be a portable media player, a computing device, a smartTV, a mobile phone, or any other electronic device having circuitry for wirelessly streaming media over a Bluetooth® connection.

The wireless speakers 202, 204 may be individually paired to the media source 206 via wireless communication links/pairings 116, such as Bluetooth® links. In an embodiment, the wireless speakers 202, 204 and media source 206 may be coupled together in an advanced audio distribution profile (A2DP) configuration. For example, the media source 206 may operate as a source (SRC) and the left and right wireless speakers 202, 204 may operate as sinks (SNK). Similar to the embodiment illustrated in FIG. 1, the wireless communication links 116 between the media source 206, 208 and each of the wireless speakers 202, 204 may include or be supplemented by a command channel 118. In various embodiments, the command channel 118 may be a separate communication channel, or may be a portion of or share the main wireless communication link 116 over which media data are communicated.

The media source 206 may include an encoder for encoding audio data into audio data packets and a transmitter for wirelessly transmitting audio streams to the left and right wireless speakers 202, 204. The wireless speakers 202, 204 may include a receiver for receiving wireless audio streams, a decoder for decoding the received audio streams into audio data, and a speaker for generating sounds. In an embodiment, audio data may be transmitted from the media source 206 to left and right wireless speakers 202, 204 through different sequential communication frames of a time divisional multiple access (TDMA) network.

Generally, a perception of spatial depth and directionality may be created by accurately controlling the relative timing of sounds generated by each of the left and right speakers or earphones. However, the frames/packets may be transmitted to the respective wireless speakers through separate left and right communication channels, which may experience different propagation delays or transmission errors. This may result in each speaker receiving the signal at slightly different times. Since the audio signals are streamed to a plurality of physically separated speaker devices over different channels which may have different deliver time characteristics, the audio signals must be synchronized and/or coordinated in order for the sounds generated from the speakers to reach a listener within the relative delay tolerance required for a satisfactory user experience. The various embodiments provide methods for synchronizing a plurality of wireless audio streams on wireless audio receiver devices in order to generate sounds that reach the user at the correct times.

Figure 3:
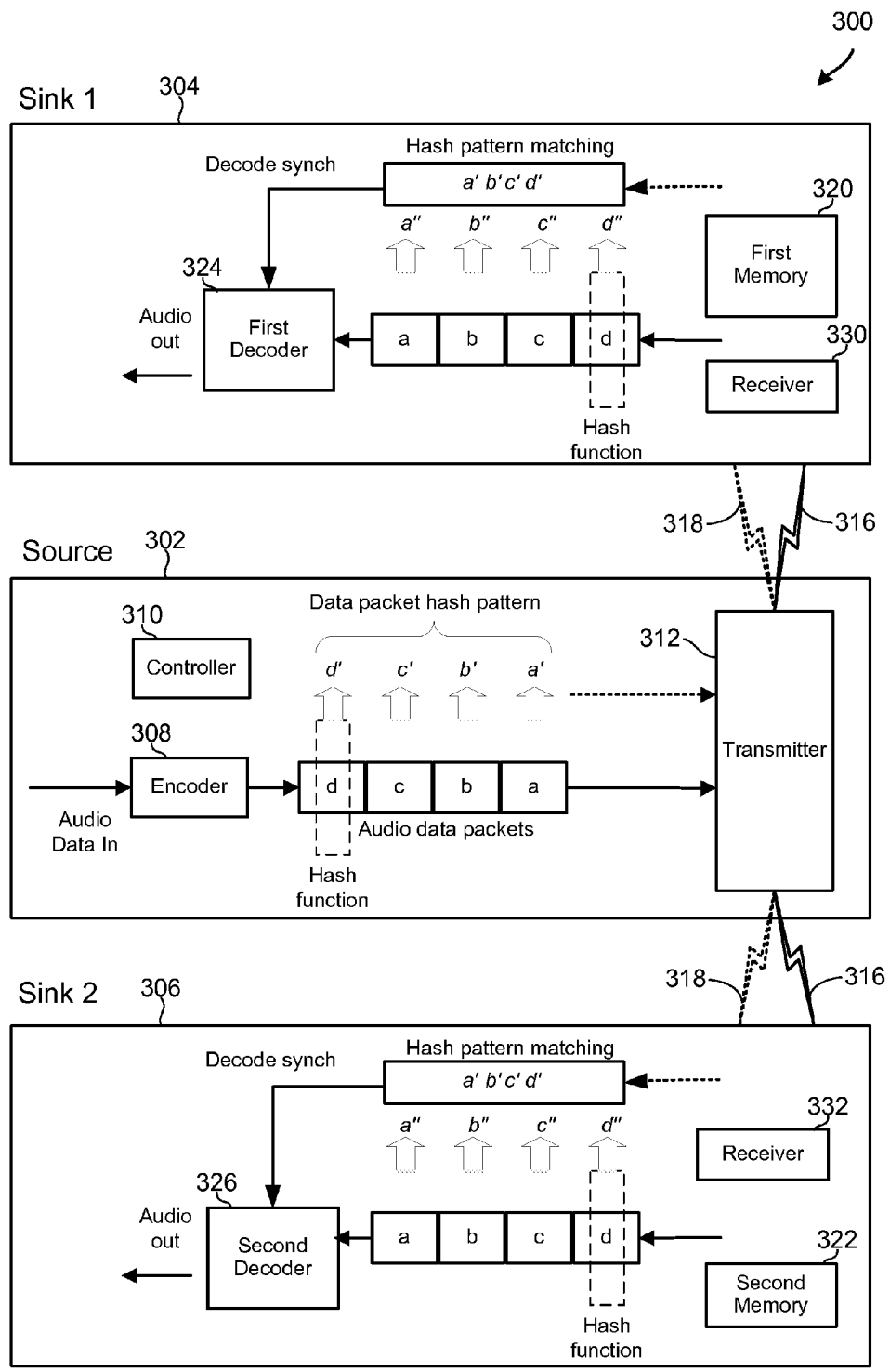
FIG. 3 is a system component block diagram illustrating example logical components and information flows in a wireless system suitable for implementing the various embodiments.

FIG. 3 illustrates example logical components and information flows in a wireless system 300 suitable for implementing the various embodiments. In the example illustrated in FIG. 3, the wireless system 300 includes a source device 302, a first speaker device 304, and a second speaker device 306. The source and speaker devices 302, 304, 306 may be coupled together in a wireless configuration, such as the Bluetooth® advanced audio distribution profile (A2DP) configuration.

Each of the first and second speaker devices 304, 306 may include a receiver circuit 330, 332 (e.g., a Bluetooth® transceiver) for receiving a data stream 316 and a control stream 318, a memory 320, 322 for storing received data, and a decoder 324, 326 for decoding the data into audio output. The source device 302 may include an encoder 308 for encoding audio data into the data stream 316, a controller 310 for generating the control stream 318, and a transmitter 312 for sending the data and control streams 316, 318 to the first and second speaker devices 304, 306. The control stream 318 may be an out-of-band control stream that is transmitted over a logical link that is separate from the link used to transmit the data stream. The transmitter 312 may send the data and control streams 316, 318 to the first and second speaker devices 304, 306 via broadcast, multicast, simulcast, unicast or any combination thereof.

The encoder 308 may receive audio data (e.g., from a media player of the source device, from an external device, etc.) and encode the audio data into a series of frames (e.g., frames d, c, b, a). This may be achieved using any framed-based transport technology or communication protocol. The source device 302 may package the frames into audio data packet streams 316 for transmission to the first and second speaker devices 304, 306. The audio streams 316 may be sent via the transmitter 312, and received in the receivers 330, 332 of the first and second speaker devices 304, 306. Each of the speaker devices 304, 306 may extract the frames (e.g., a, b, c, d) from the received audio stream 316 and store them in a memory 320, 322.

The source device 302 may perform hash operations on the generated data frames (e.g., frames d, c, b, a) to generate a sequence of one or more hashes (e.g., d', c', b', a') that provide a recognizable pattern of the transmitted frames. The source device 302 may be configured to vary the number of hashes transmitted per unit time and/or the number of data frames included in each hash. Such variation in numbers of hashes transmitted and/or the number of data frames included in each hash may be bade in response to operational needs of the device, the data being communicated, and/or a context of the communication. For example, the source device 302 may be configured to generate a larger number of hashes per unit time (i.e., to provide more reliable synchronization) when resources are abundant, and a smaller number of hashes per unit time when resources are scarce. In an embodiment, the source device 302 may be configured to generate the hashes to be long enough to avoid false positives and short enough to not require an excessive number of resources to generate and compare them within the speaker devices 304, 306. The number hashes may also be determined based on the variability of each individual hash. For example, a smaller number of hashes may be generated in situations where the hashes are highly variable, while a larger number of hashes may be generated when the variability from frame to frame is low (e.g., when the encoded sound is relatively uniform).

In an embodiment, the hash length may be determined based on the actual data that is being hashed. For example, a longer hash may be generated for data representing long periods of silence to account for the lack of variance in the data, whereas shorter hashes may be generated for data representing periods of highly distinguishable sounds. The hash length may also be computed based on variability and the amount of data in the hash (i.e., its dynamic range), the probability of collision, the complexity of the hashing algorithm, or any combination thereof. In an embodiment, the variability of the hashes may be determined based on the complexity of the hashing algorithm used to generate the hashes (e.g., hashes generated from more complex algorithms are more likely to have greater variability).

In an embodiment, the controller 310 may generate the control stream 318 and include within the generated hash sequence (e.g., d', c', b', a'). The control stream 318 may also include other information, such as rendering instructions, which may identify when certain portions of the audio are to be played by the receiving speaker devices. The rendering instructions may also include timestamps that identify a playback time, which may be relative to a Bluetooth® network clock. In an embodiment, the control stream 318 may further include information for cross-referencing the hash sequence to the data frames received via the data stream 316.

As mentioned above, the source device 302 may send the audio stream containing data frames 316 (e.g., frames d, c, b, a) and the control stream 318 containing hashes (e.g., d', c', b', a') to the first and second speaker devices 304, 306. The first and second speaker devices 304, 306 may receive the audio and control streams 316, 318, extract the data frames (e.g., a, b, c, d) from the audio stream 316, and temporarily store the extracted frames (e.g., a, b, c, d) in a memory 320, 322 (e.g., a data buffer). Each speaker device 304, 306 may apply a hash function to the received data frames (e.g., a, b, c, d) in order to generate an independent stream of hash values (e.g., a", b", c", d") which are reflective of the data frames being received and/or stored in memory 320, 322. The hash algorithm used by the speaker devices 304, 306 may be the same algorithm as used by the source device to generate the hashes (e.g., a', b', c', d') sent over the control stream 318. The speaker devices 304, 306 may compare the generated independent stream of hashes (e.g., a", b", c", d") to the source-provided hash sequence (e.g., d', c', b', a') received via the control stream 318. When the generated hashes or a pattern of hashes match the received hashes or a pattern of hashes, this may communicate that the corresponding data frames may be played (i.e., used to generate sound), and based on this, the speaker devices 304, 306 may decode the audio stream and render the audio. In this manner, the various embodiments provide a synchronization mechanism that is independent of the data stream data (e.g., the A2DP data).

In an embodiment, the system 300 may be configured so that the first and second speaker devices 304, 306 detect a match between the hashes at approximately the same time, aligning the first and second speaker devices 304, 306 and enabling synchronized playback of the audio. In an embodiment, if it is determined that the hashes match, the speaker devices 304, 306 may decode and render the audio according to additional instructions included in the control stream 318, such as at a time identified by a timestamp included in the render instructions. In an embodiment, the system 300 may include a Bluetooth® piconet clock that may be used to coordinate the start of audio playback between the speaker devices 304, 306 if it is determined that the hashes match and the frames are in sync.

In an embodiment, frames of the incoming audio stream 316 may be ignored (e.g., dropped, erased from memory, etc.) until it is determined that the hashes match. In an embodiment, the stored frames that do not match the hashes may be periodically removed from memory, such as by being written over by later received data frames. In an embodiment, the speaker devices 304, 306 may begin storing data frames received from the incoming data stream after it is determined that the generated and received hashes match. In an embodiment, the speaker devices 304, 306 may be configured to hold the audio playback of the incoming audio stream for a predetermined or computed amount of time after it is determined that the hashes match. Thus, detecting when generated and received hash values or hash patterns match may be used as a synchronization event that may serve as a starting point for rendering streaming media, as a starting point to begin receiving and rendering streaming media and/or a time reference point against which timing delays in a channel may be measured.

The source device 302 and the speaker devices 304, 306 may use any of a variety of hash functions to generate the hash values. In an embodiment, a forward error correction (FEC) algorithm may be used to generate the hashes. In an embodiment, a cyclic redundancy check (CRC) algorithm may be used to generate the hashes. For example, the frames may serve as keys, and check values generated by the CRC algorithm may serve as the hash values. In a further embodiment, very simple algorithms may be used to generate the hash values, such as summing the bits within the frame, multiplication or division of the frame by a constant, etc. While the values generated by simple hash algorithms may not be unique, the hash values of a sequence of data frames would form a pattern across a number of data frames that may be recognized when the generated hash values are compared to the stream of received hash values.

Various embodiments may use the hash values to simultaneously synchronize multiple receiver devices (e.g., speaker devices 304, 306) to the same data stream. Using the various embodiments enables the multiple receiver devices to be synchronized to the data stream based on the content of the audio data, without requiring timestamps or other synchronization data to be embedded into the data streams In an embodiment, the speaker devices 304, 306 may include a temperature and/or infrared sensor that detects when the device is being used (e.g., when an earpiece is in a user's ear). In an embodiment, the speaker devices 304, 306 may be configured to perform the synchronization operations in response to detecting that the device is in use (e.g., via the temperature sensor). In an embodiment, the speaker devices 304, 306 may be configured to stop performing synchronization operations in response to detecting that the device is no longer in use (e.g., when the sensed temperature data drops).

Figure 4A:
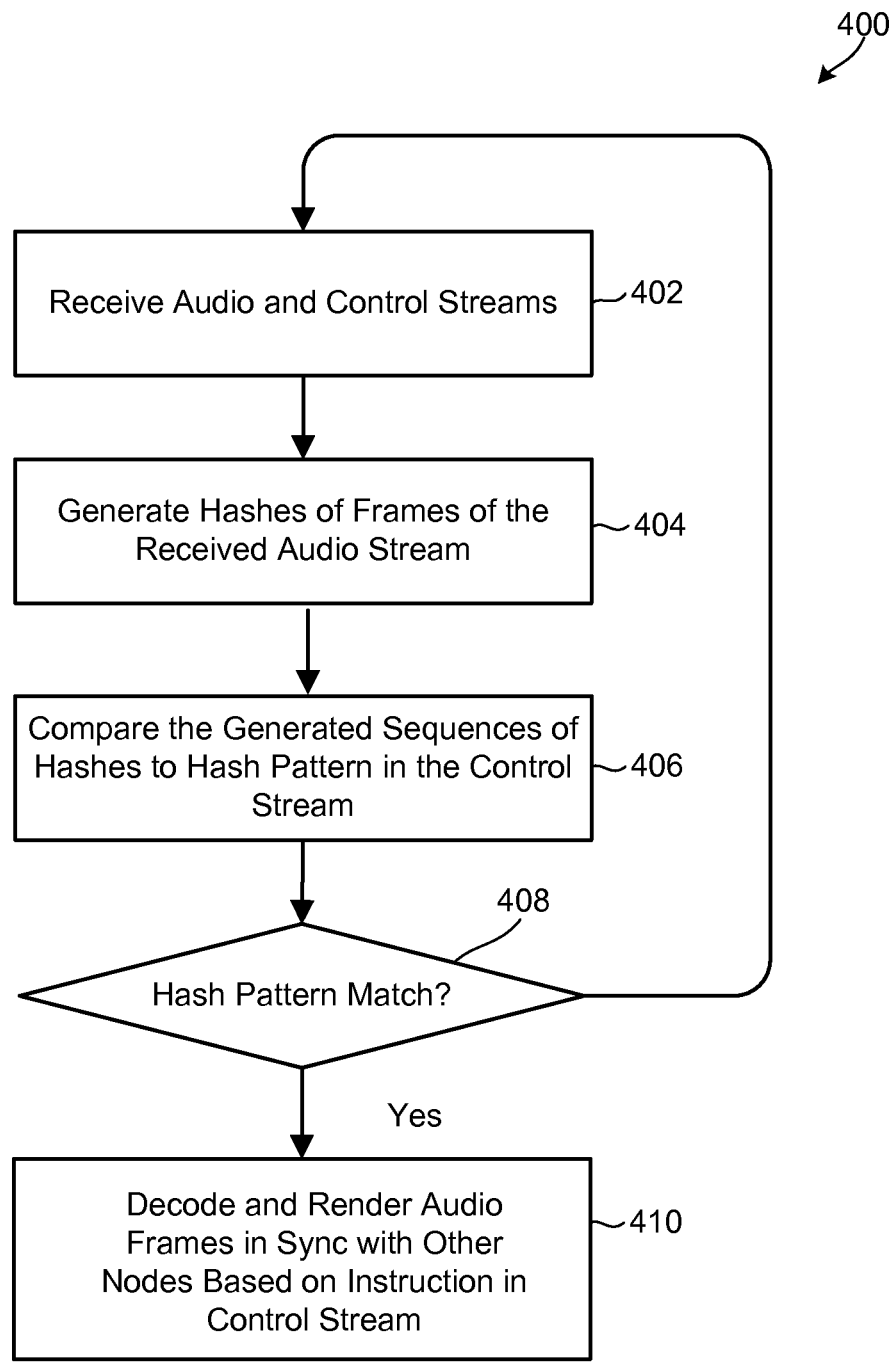
FIG. 4A is a process flow diagram of an embodiment receiver device method of synchronizing a plurality of wireless audio streams on a plurality of wireless audio receiver devices.

FIG. 4A illustrates an embodiment receiver device method 400 for synchronizing a plurality of wireless audio streams on a plurality of wireless audio receiver devices. In block 402, a receiver device (e.g., an earpiece or other speaker device) may receive the audio and control streams transmitted by a source device, extract data frames from the audio stream, and store the extracted data frames in memory. In block 404, the receiver device may apply a hash function to the received data frames to generate an independent sequence of hashes characterizing the received data frames. In block 404, the receiver device may apply the hash function to each data frame as it is received, or it may apply the hash function to data frames stored in memory. In block 406, the receiver device may compare the generated hashes to a hash sequence received via the control stream in block 402. In determination block 408, the receiver device may determine if the generated and received hashes or a pattern of a sequence of hashes match. If the generated and received hashes do not match (i.e., determination block 408="No"), no rendering of the data may occur and the receiver device may continue to perform the operations in blocks 402-406. When the generated and received hashes match (i.e., determination block 408="Yes"), the receiver device may begin decoding the received stream of data frames (e.g., by recalling the data frames from memory) and begin rendering the data, such as by generating audio from speaker devices. In this manner, the rendering of data frames in the receiver device will be in synch with the rendering of data frames by other receiver devices. Since the information used to determine when the received data stream should be rendered is generated from the data itself, the various embodiments provide a synchronization mechanism that is independent of the data stream data (e.g., the A2DP data) and capable of synchronizing multiple receiver devices to the same data stream without the inclusion of additional synchronization data.

Figure 4B:
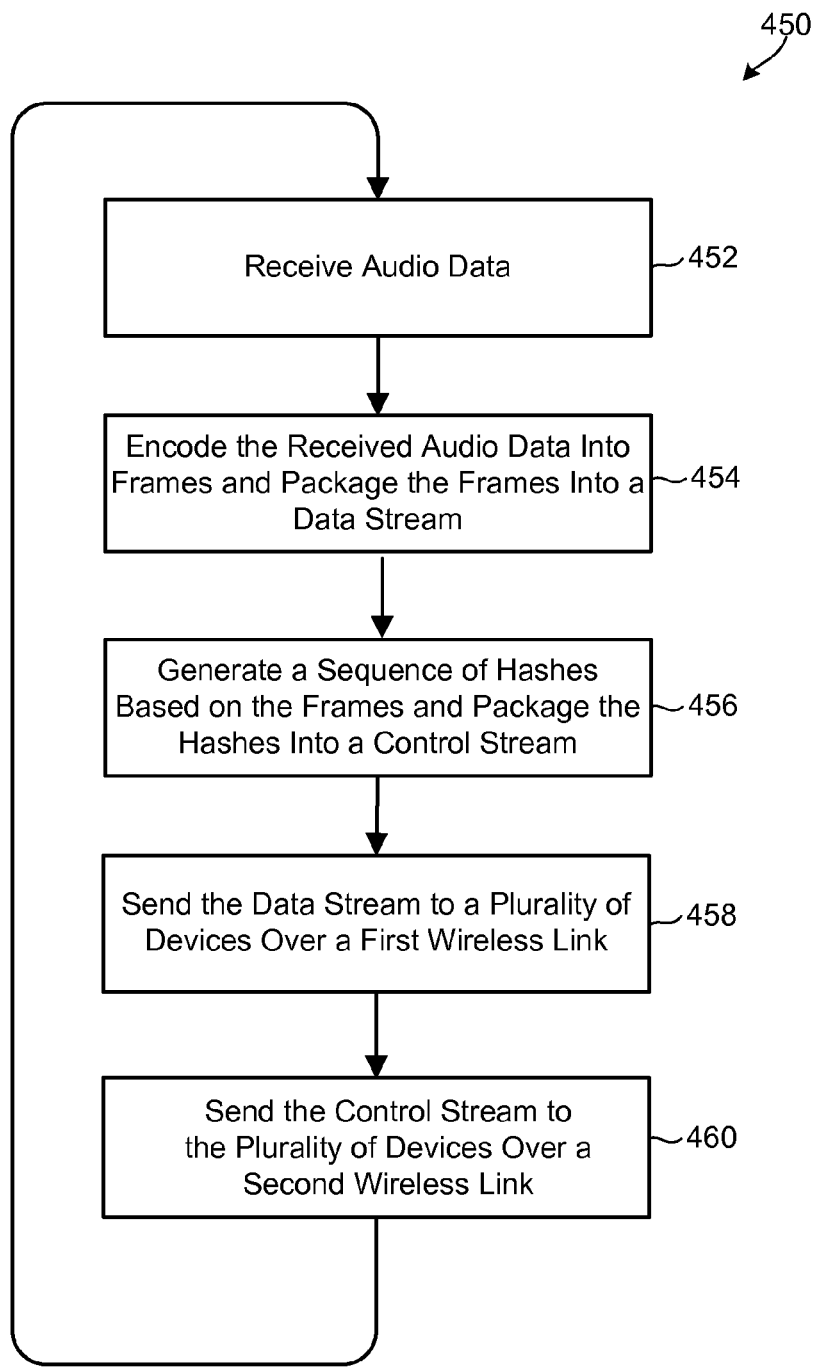
FIG. 4B is a process flow diagram of an embodiment source device method of generating a wireless audio stream suitable for synchronizing on a plurality of wireless audio receiver devices according to the various embodiments.

FIG. 4B illustrates an embodiment method 450 that may be implemented in a source device for generating a plurality of wireless audio streams so that the data streams may be synchronized on a plurality of wireless receiver devices using method 400 described above. In block 452, the source device may receive audio data for transmission (e.g., from a media player of the source device, from an external device, etc.). In block 454, the source device may encode the audio data into a series of data frames and package the data frames into an audio data packet stream. In block 456, the source device may apply a hash algorithm to the data frames in the sequence the frames will be transmitted in order to generate a sequence of hash values characterizing the data frames, and package the generated hash values into a control stream. In block 458, the source device may transmit the data stream to a plurality of wireless receiver devices over a first wireless communications link. In block 460, the source device may transmit the control stream to the plurality of wireless receiver devices over a second wireless communications link. For example, the source device may send the control stream over a logical link that is separate from the link used to transmit the data stream.

As discussed above, in order to provide users with a full stereophonic sound experience (e.g., spatial depth, directionality, etc.), the left and right audio signals must be coordinated so that the sounds generated in each ear are received at precise times within 20 μsec. The signals must be sufficiently spaced to create an intended stereo or surround sound effect, but not so much that the signal delays are recognizable to human ears. In an embodiment synchronization of the stereo sound on the two wireless nodes (e.g., left and right earpieces) may be accomplished by using a wireless network clock (e.g., the Bluetooth® protocol clock) to synchronize rendering of the transmitted audio data in each wireless node. Thus, in addition to using the hash-matching mechanisms for synchronizing blocks of audio data as described above, the precise timing of the rendering (i.e., playing) of each audio data block may be synchronized using a clock signal included in the wireless transmissions. In such embodiments, audio data may be encoded for transmission with reference to a source node (e.g., cell phone) domain clock and sent to one or more of the wireless receiver nodes (e.g., left earpiece, right earpiece, etc.) for playback. The encoded audio data may be received by a wireless receiver node (e.g., left earpiece) and decoded at rates synchronized with respect to a first local clock domain based on clock signal included in the wireless transmissions. Such synchronizing may enable the wireless nodes to compensate for any clock drift that occurs between the source node clock domain (e.g., cell phone clock domain) and the first local clock domain in the receiving wireless node (e.g., left earpiece).

This embodiment may be extended to system implementations in which audio data is transmitted from the source node (e.g., a cell phone) to a first wireless node (e.g., the left earpiece), which then sends at least a portion (e.g., the right channel) of the audio data to the second wireless node (e.g., the right earpiece). By encoding the second channel data transmitted from the first wireless node to the second wireless done with respect to the domain clock signal, the rendering of audio in the second wireless node can be synchronized that of the first wireless node within the required tolerances. The data may be sent from the first wireless node to the second wireless receiver (e.g., left earpiece) and decoded at variable rates with respect to the domain clock or to the local clock of the first wireless node domain, in a manner that compensates for any clock drift that occurs between the first and second local clock domains.

Embodiment methods of synchronizing stereo sound on the two wireless nodes (e.g., left and right earpieces) by using a network clock enable the alignment of the left and right channels so that there is no more than 20 μsec of error between the two wireless receiver nodes (e.g., left and right earpieces), thereby preventing misalignments from being detectable by the user.

The Bluetooth® specifications describe an advanced audio distribution profile (A2DP) that enables the creation of a Bluetooth® channel through which advanced audio data may be streamed from one Bluetooth®-enabled device to another Bluetooth®-enabled device. However, A2DP does not support synchronizing the alignment of the left and right channels in situations where the left and right channels are handled by separate Bluetooth® radios (and separate clock domains). To overcome this and other limitations of Bluetooth®, the various embodiments may align each of the left and right device playback clocks with the audio data stream in such a way that the left and right channels remain synchronized within 20 μsec of error.

In an embodiment, the clock synchronization operations may be performed in two steps, which may include aligning the A2DP stream to a clock of a primary wireless node (e.g., a source node) in a first clock synchronization step, and aligning the clock of the secondary wireless node to the clock of the primary wireless node in a second clock synchronization step. For example, in the first operation, a left earpiece may receive the A2DP data stream from an external A2DP source device (e.g., a phone) and decode the left channel into a buffer of audio samples. The left earpiece may check the level of its buffer against a high and low watermark, and if it is determined that the buffer level crosses a watermark, the left earpiece may add or drop a single sample in a pulse code modulation (PCM) buffer. The left earpiece may also modify the current A2DP frame before sending it from the right earpiece so that the right earpiece may perform the same add/drop modifications at the same relative sample position in the right channel. In the second operation, the right earpiece may be assigned the role of Bluetooth® slave, and may access the clock of the left earpiece by, for example, exposing one or more bits of the shared Bluetooth® piconet clock on a pin on the Bluetooth® transceiver chip. The Bluetooth® clock may latch a hardware counter that is counting clock ticks in the right earpiece's clock domain. Software running on the right earpiece may read each latch counter value to accumulate a clock drift error in units of its own clock domain. When the error is determined to be +−¾ of one sample, a single sample may be added or dropped in the right earpiece audio stream such that the accumulated error is appropriately adjusted by +−1 sample.

Figure 4C:
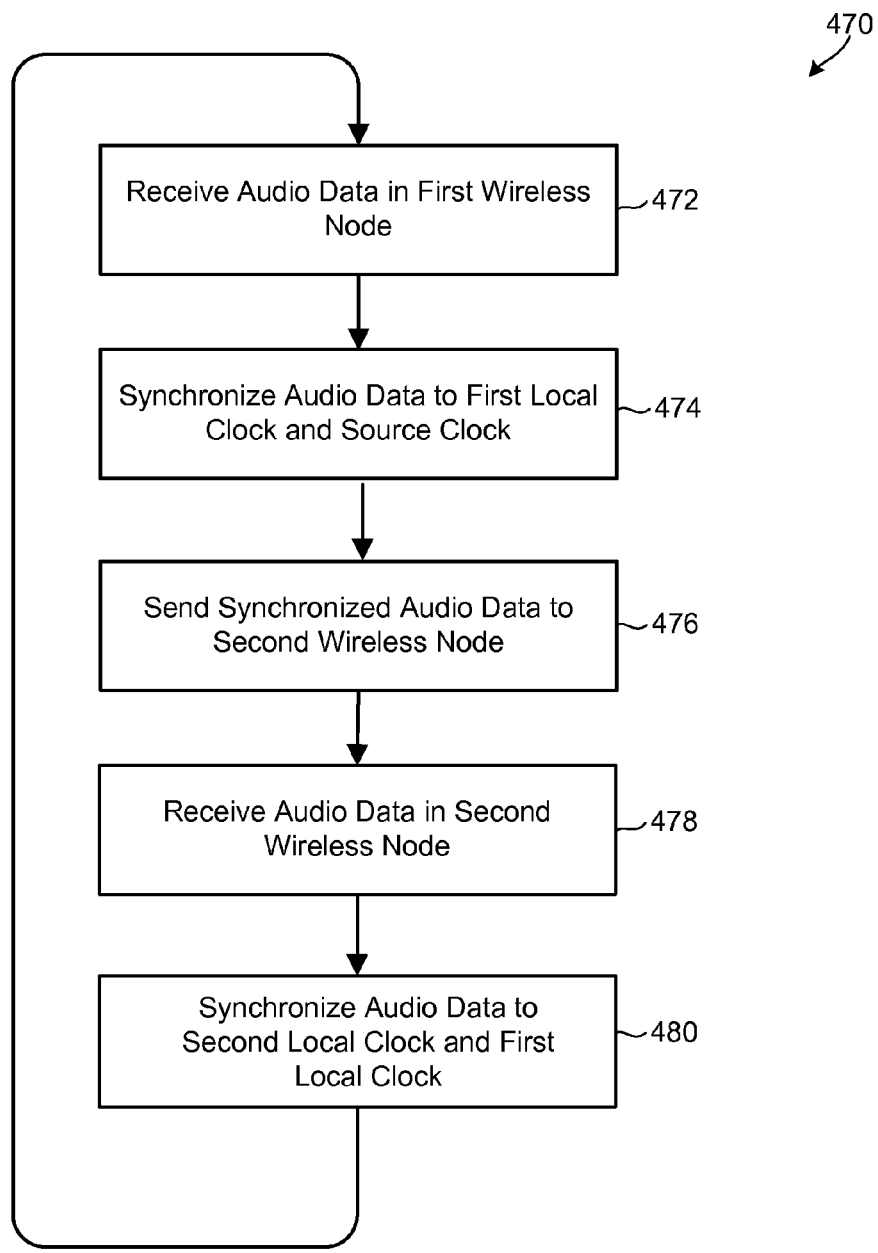
FIG. 4C is a process flow diagram of an embodiment method that may be implemented in a wireless receiver nodes for synchronizing audio streams on devices having separate Bluetooth® radios.

FIG. 4C illustrates an embodiment method 470 that may be implemented in a wireless receiver nodes for synchronizing audio streams handled by separate Bluetooth® radios. In block 472, a first wireless receiver node may receive audio data from a source node (e.g., from a media player of a source device, from an external device, etc.). In block 474, the first wireless receiver node may align the data stream to a clock of a first wireless receiver node to generate synchronized data. This may be achieved by, for example, the first wireless receiver node decoding a first channel into a buffer of audio samples, checking the level of its buffer against a high and low watermark, adding or dropping samples in a PCM buffer, and modifying the data stream so that a second wireless receiver node may perform the same add/drop modifications at the same relative sample position in a second channel. In block 476, the first wireless receiver node may send the synchronized audio data to a second wireless receiver node. In block 478, the second wireless receiver node may receive the synchronized audio data. In block 480, the second wireless receiver node may take on the role of Bluetooth® slave, exposing one or more bits of the shared Bluetooth® clock on a pin, latch a hardware counter that is counting clock ticks in the second wireless receiver node clock domain, read each latch counter value to accumulate a clock drift error in units of its own clock domain, and add or drop samples to synchronize the audio data to the second local clock and the first local clock. In an embodiment, as part of block 480, the second wireless receiver node may determine if the accumulated error between the clock of the second wireless receiver and the Bluetooth clock requires a corresponding correction to the audio samples, and add or remove audio samples from the buffer in response to determining that the accumulated error between the clock of the second wireless receiver and the Bluetooth clock requires a corresponding correction to the audio samples.

In an embodiment, the first wireless receiver device may use buffer thresholds to trigger the add/drop operations, and the second wireless receiver device may use a clock drift detection circuit to trigger perform the add/drop operations in response to the trigger. In an embodiment, the second wireless receiver device may use buffer thresholds to trigger the add/drop operations.

The first receiver node may be assigned the role of Bluetooth® master and supply the Bluetooth® clock used to coordinate all Bluetooth® activity. As a result, the first wireless receiver node clock, the codec clock (the clock at which the audio data is consumed), and the Bluetooth® clock may be the same clock or fully synchronized clocks. The second receiver node may be assigned the role of Bluetooth® slave and in that mode track the clock of the first receiver node in order to synchronize the processing of audio data by the audio processing circuit within the second receiver node.

A notable feature of embodiment method 470 discussed with reference to FIG. 4C is the use of the Bluetooth® clock to align the audio data on the second receiver node. The Bluetooth® clock may be exposed to the processor and/or the audio processing circuit on the second receiver node in such a way that the Bluetooth® clock pulses can be used to align the rate of audio data consumption on the second receiver node (i.e., the rate at which audio data is used to generate analog signals applied to the node's speaker) to that of the first receiver node. As such, the Bluetooth® piconet clock may be used on a Bluetooth® slave device to align the audio data. Since either receiver node may serve as master or slave, the Bluetooth® clock may be exposed to the processor and/or the audio processing circuit in both receiver nodes.

Figure 5:
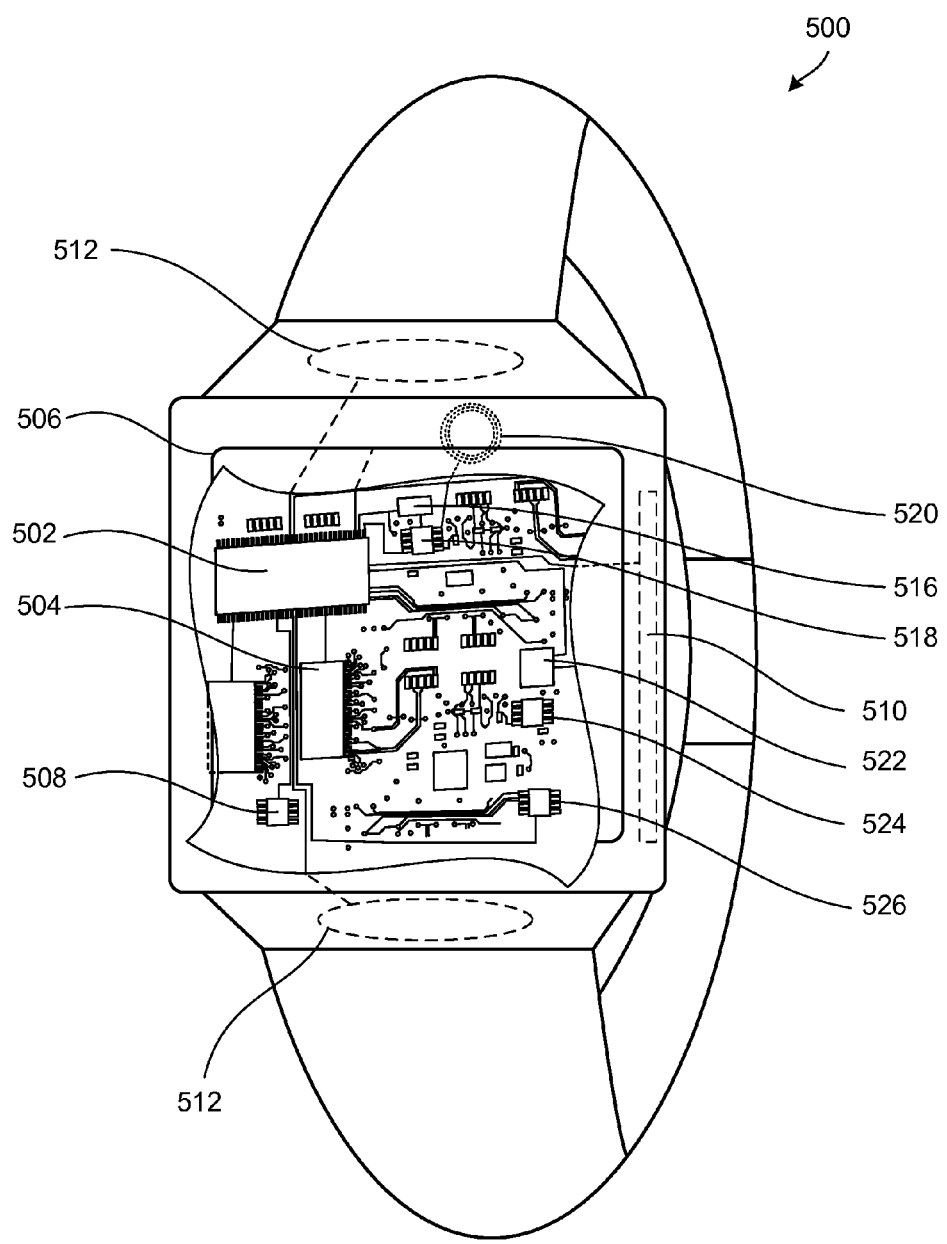
FIG. 5 is an illustration of a wireless wrist watch-type computing device suitable for use with the various embodiments.

The various embodiments described above may be implemented using a variety of wireless-enabled mobile computing devices, such as a wrist watch-type computing device ("wrist display") 500 illustrated in FIG. 5. A wrist watch computing device 500 may include a processor 502 coupled to a volatile and/or non-volatile internal memory 504, which may be secure and/or encrypted memories, unsecure and/or unencrypted memories, or any combination thereof. The processor 502 may also be coupled to an electronic display screen 506, which may be a touch screen display (e.g., resistive-sensing touch screen, capacitive-sensing touch screen infrared sensing touch screen, etc.). The wrist display 500 may have one or more radios (e.g., RF radio) and/or antennas 508 for sending and receiving electromagnetic radiation that may be connected to a wireless data link and coupled to the processor 502. The radios/antennas 508 may be used with the above-mentioned circuitry to implement the Bluetooth® protocol stack/interface (i.e., the wrist display 500 may be Bluetooth® enabled).

The wrist display 500 may also include a slide sensor 510 and physical buttons 512 for receiving user inputs. The wrist display 500 may include a battery 516 coupled to an inductive charging circuit 518, and a coil antenna 520 which may be an inductive coil adapted to enable inductive charging of the battery 516. The battery 516 and inductive charging circuit 518 may be coupled to the processor 502 to enable the wrist display 500 to control inductive charging and generate messages via the coil antenna 520. The wrist display 500 may further include a vibratory motor 522, and various sensors, such as a temperature sensor 524 and accelerometer 526, all of which may be coupled to the processor 502.

Figure 6:
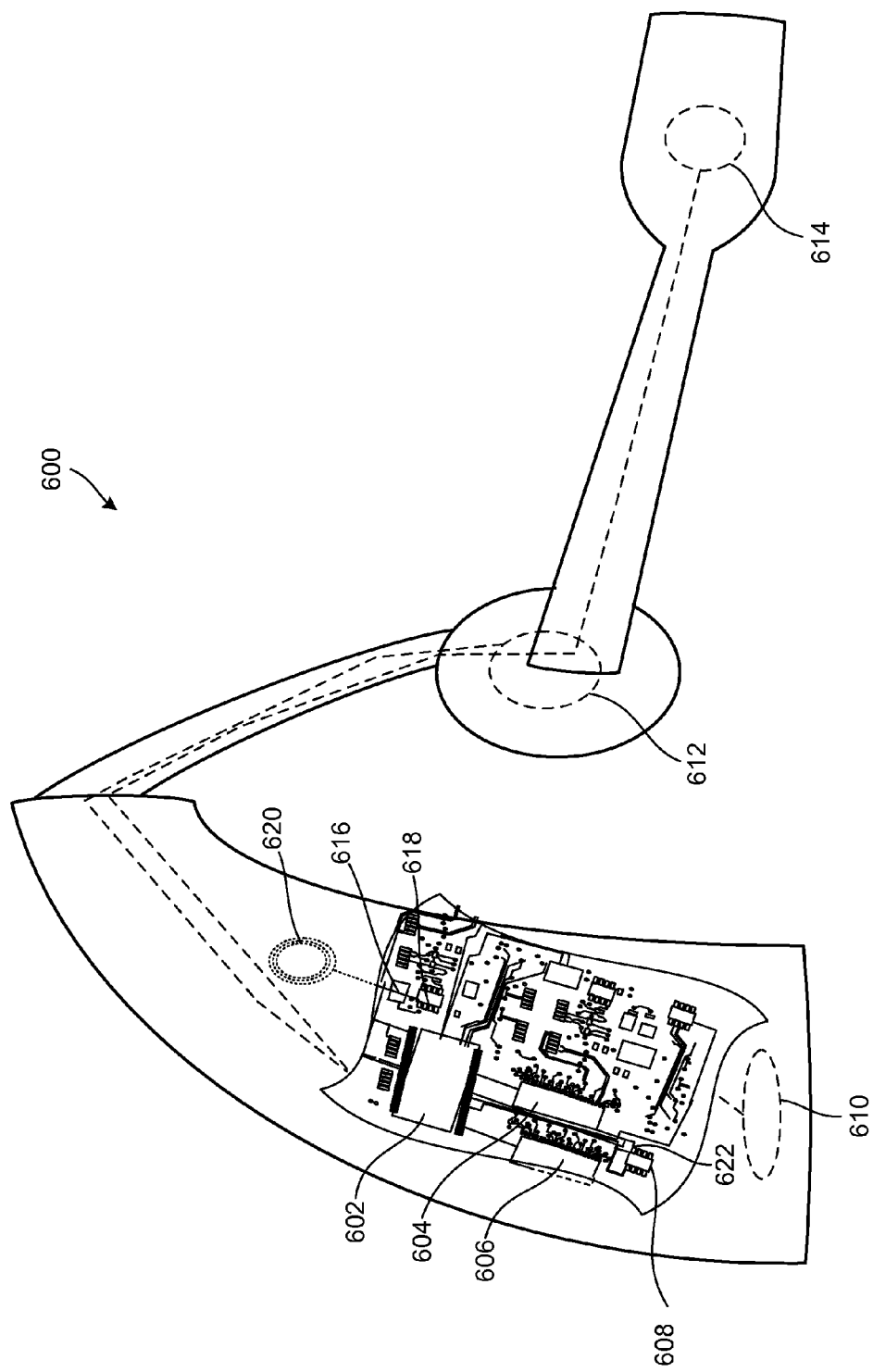
FIG. 6 is an illustration of a wireless earpiece suitable for use with the various embodiments.

Other examples of wireless-enabled mobile computing devices that may be used to implement the various embodiments described above include wireless earpieces, such as wireless earpiece 600 as illustrated in FIG. 6. A wireless earpiece 600 may include a processor 602 coupled to volatile and/or non-volatile internal memory 604, The wireless earpiece 600 may include one or more radio circuits 608 coupled to antenna(s) for sending and receiving electromagnetic radiation that may be connected to a wireless data link and coupled to the processor 602. The radio circuits 608 may be used with the above-mentioned circuitry to implement the Bluetooth® protocol stack/interface (i.e., the wireless earpiece 600 may be a Bluetooth® enabled wireless communication device). The processor 602 may also be coupled to an audio processing circuit 606, such as a digital signal processor (DSP). The audio processing circuit 606 may be configured to process digital audio data (e.g., received via the radio circuits 608) and provide analog signals to a speaker 612 to generate sound. Each Bluetooth® radio circuit 608 may include one or more clock pins 622 that provide clock pulses associated with the wireless network (e.g., a Bluetooth® piconet clock) and/or trigger clocks (e.g., a Bluetooth® trigger clock). The clock pin(s) 622 may be connected to the processor 602, the audio processing circuit 606, and/or other earpiece components (e.g., system clock, buss clock, etc.).

The wireless earpiece 600 may also include one or more physical buttons 610 for receiving user inputs, and a microphone 614 to receive audio input, all of which may be coupled to the processor 602. The wireless earpiece 600 may further include a battery 616 coupled to an inductive charging circuit 618, and a coil antenna 620 which may be an inductive coil adapted to enable inductive charging of the battery 616.

Figure 7:
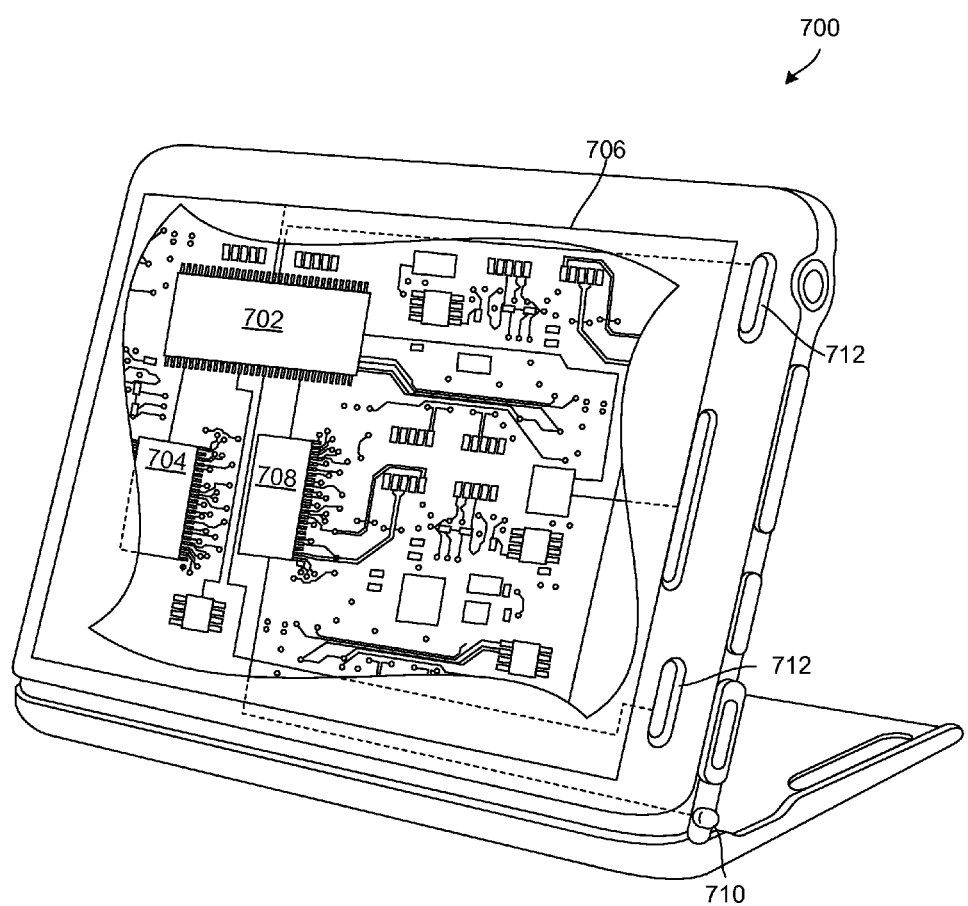
FIG. 7 is an illustration of an example mobile device suitable for use with the various embodiments.
Figure 8:
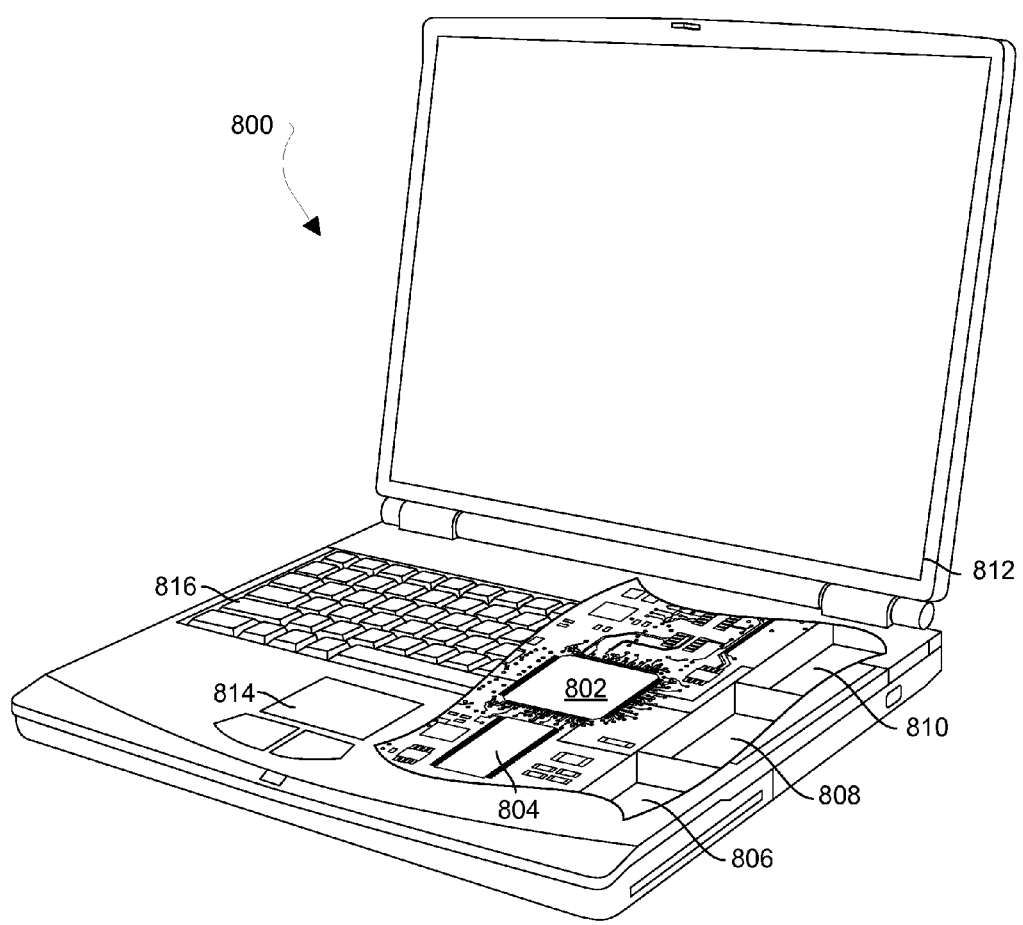
FIG. 8 is an illustration of an example laptop computer suitable for use with the various embodiments.

The various embodiments may also be implemented using any commercial computing devices having an RF radio, examples of which are illustrated in FIGS. 7 and 8. Typical mobile computing devices 700 will have in common the components illustrated in FIG. 7. For example, mobile computing devices 700 may include a processor 702 coupled to an internal memory 704 and a touch surface input device/display 706, such as a resistive sensing touchscreen, capacitive sensing touchscreen, infrared sensing touchscreen, acoustic/piezoelectric sensing touchscreen, or the like. The computing device 700 may have a radio/antenna 710 for sending and receiving electromagnetic radiation that is connected to a wireless data link and/or cellular telephone transceiver 708 coupled to the processor 702. Computing devices 700 may also include physical buttons 712 for receiving user inputs.

Other forms of computing devices, including personal computers and laptop computers, may be used to implement the various embodiments. Such computing devices typically include the components illustrated in FIG. 8, which illustrates an example laptop personal computer 800. Such a personal computer 800 generally includes a processor 802 coupled to volatile memory 804 and a large capacity nonvolatile memory, such as a disk drive 806. The computer 800 may also include a compact disc (CD) and/or DVD drive 808 coupled to the processor 802. The computer device 800 may also include a number of connector ports coupled to the processor 802 for establishing data connections or receiving external memory devices, such as a network connection circuit 810 for coupling the processor 802 to a network. The computing device 800 may have a radio/antenna 810 for sending and receiving electromagnetic radiation that is connected to a wireless data link coupled to the processor 802. The computer 800 may further be coupled to a keyboard 816, a pointing device such as a mouse 814, and a display 812 as is well known in the computer arts.

The processors 502, 602, 702, 802 may be any programmable microprocessor, microcomputer or multiple processor chip or chips that may be configured by software instructions (applications) to perform a variety of functions, including the functions of the various embodiments described herein. Multiple processors may be provided, such as one processor dedicated to wireless communication functions and one processor dedicated to running other applications. Typically, software applications may be stored in the internal memory before they are accessed and loaded into the processor 502, 602, 702, 802. In some devices, the processor 502, 602, 702, 802 may include internal memory sufficient to store the application software instructions. In some mobile devices, the secure memory may be in a separate memory chip coupled to the processor 502, 602, 702, 802. The internal memory may be a volatile or nonvolatile memory, such as flash memory, or a mixture of both. For the purposes of this description, a general reference to memory refers to all memory accessible by the processor, including internal memory, removable memory plugged into the device, and memory within the processor 502, 602, 702, 802 itself.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module that may reside on a non-transitory processor-readable or computer-readable storage medium. Non-transitory processor-readable and computer-readable media may be any available storage media that may be accessed by a computer or a processor of a computing device. By way of example, and not limitation, such non-transitory processor-readable or computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer or processor of a computing device. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory processor-readable medium and/or non-transitory computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein.

What is claimed is:

1. A method of processing a data stream within a receiver device, comprising:
    receiving a sequence of data frames in the receiver device via a first wireless communication link;
    applying a hash algorithm to the received data frames to generate a first sequence of hash values;
    receiving a control stream comprising a second sequence of hash values;
    comparing the first and second sequences of hash values; and
    determining when to begin processing received data frames based upon when the first and second sequences of hash values match.

2. The method of claim 1, wherein determining when to begin processing received data frames based upon when the first and second sequences of hash values match comprises beginning to process audio data frames in order to generate sound, and wherein the receiver device is one of a plurality of wireless speaker devices.

3. The method of claim 1, wherein:
    the sequence of data frames comprises an audio data stream;

receiving the control stream comprising the second sequence of hash values comprises receiving a control stream that includes timestamp information; and determining when to begin processing received data frames based upon when the first and second sequences of hash values match comprises determining when to begin decoding the audio data stream when the timestamp information matches a network clock signal.

4. The method of claim 1, wherein:

the sequence of data frames comprises an audio data stream;

receiving the control stream comprising the second sequence of hash values comprises receiving a control stream that includes clock information; and determining when to begin processing received data frames based upon when the first and second sequences of hash values match comprises determining when to begin decoding the audio data stream based upon received clock information and a network clock.

5. The method of claim 1, further comprising:

storing the received data frames in a buffer; and generating a new second sequence of hashes based on most recently received data frames stored in the buffer when the first and second sequences of hash values do not match.

6. The method of claim 1, wherein applying the hash algorithm to the received data frames comprises applying a cyclic redundancy check to the received data frames.

7. The method of claim 1, wherein applying a hash algorithm to the received data frames comprises applying a forward error correction algorithm to the received data frames.

8. The method of claim 1, wherein comparing the first and second sequences of hash values comprises comparing a hash value for each received data frame to determine when there is a match.

9. The method of claim 1, wherein comparing the first and second sequences of hash values comprises comparing a sequence of hash values spanning a plurality of data frames to determine when a pattern of hash values match.

10. The method of claim 1, wherein the control stream is transmitted as part of the first wireless communication link, and receiving the control stream comprising the second sequence of hash values comprises receiving the control stream from the first wireless communication link.

11. The method of claim 1, wherein the control stream is transmitted via a second wireless communication link different from the first wireless communication link, and receiving the control stream comprising the second sequence of hash values comprises receiving the control stream from the second wireless communication link.

12. A wireless communication device, comprising:

a wireless receiver circuit configured to receive data frames and a control stream over a wireless communication link; and a processor coupled to the wireless receiver circuit and configured with processor-executable instructions to perform operations comprising:

receiving a sequence of data frames in a receiver device via a first wireless communication link;

applying a hash algorithm to the received data frames to generate a first sequence of hash values;

receiving a control stream comprising a second sequence of hash values;

comparing the first and second sequences of hash values; and determining when to begin processing received data frames based upon when the first and second sequences of hash values match.

13. The wireless communication device of claim 12, wherein the processor is configured with processor-executable instructions to perform operations such that determining when to begin processing received data frames based upon when the first and second sequences of hash values match comprises beginning to process audio data frames in order to generate sound, and wherein the wireless communication device is one of a plurality of wireless communication devices.

14. The wireless communication device of claim 12, wherein the processor is configured with processor-executable instructions to perform operations such that:

the received sequence of data frames comprises an audio data stream;

receiving the control stream comprising the second sequence of hash values comprises receiving a control stream that includes timestamp information; and determining when to begin processing received data frames based upon when the first and second sequences of hash values match comprises determining when to begin decoding the audio data stream when the timestamp information matches a network clock signal.

15. The wireless communication device of claim 12, wherein the processor is configured with processor-executable instructions to perform operations such that:

the sequence of data frames comprises an audio data stream;

receiving the control stream comprising the second sequence of hash values comprises receiving a control stream that includes clock information; and determining when to begin processing received data frames based upon when the first and second sequences of hash values match comprises determining when to begin decoding the audio data stream based upon received clock information and a network clock.

16. The wireless communication device of claim 12, wherein the processor is configured with processor-executable instructions to perform operations further comprising:

storing the received data frames in a buffer; and generating a new second sequence of hashes based on most recently received data frames stored in the buffer when the first and second sequences of hash values do not match.

17. The wireless communication device of claim 12, wherein the processor is configured with processor-executable instructions to perform operations such that applying the hash algorithm to the received data frames comprises applying a cyclic redundancy check to the received data frames.

18. The wireless communication device of claim 12, wherein the processor is configured with processor-executable instructions to perform operations such that applying the hash algorithm to the received data frames comprises applying a forward error correction algorithm to the received data frames.

19. The wireless communication device of claim 12, wherein the processor is configured with processor-executable instructions to perform operations such that comparing the first and second sequences of hash values comprises comparing a hash value for each received data frame to determine when there is a match.

20. The wireless communication device of claim 12, wherein the processor is configured with processor-executable instructions to perform operations such that comparing the first and second sequences of hash values comprises comparing a sequence of hash values spanning a plurality of data frames to determine when a pattern of hash values match.

21. The wireless communication device of claim 12, wherein the processor is configured with processor-executable instructions to perform operations such that receiving the control stream comprising the second sequence of hash values comprises receiving the control stream as part of the first wireless communication link.

22. The wireless communication device of claim 12, wherein the processor is configured with processor-executable instructions to perform operations such that receiving the control stream comprising the second sequence of hash values comprises receiving the control stream via a second wireless communication link different from the first wireless communication link.

23. A wireless communication device, comprising:
  means for receiving a sequence of data frames in a receiver device via a first wireless communication link;
  means for applying a hash algorithm to the received data frames to generate a first sequence of hash values;
  means for receiving a control stream comprising a second sequence of hash values;
  means for comparing the first and second sequences of hash values; and
  means for determining when to begin processing received data frames based upon when the first and second sequences of hash values match.

24. The wireless communication device of claim 23, wherein means for determining when to begin processing received data frames based upon when the first and second sequences of hash values match comprises means for beginning to process audio data frames in order to generate sound, and wherein the wireless communication device is one of a plurality of wireless communication devices.

25. The wireless communication device of claim 23, wherein:
  the sequence of data frames comprises an audio data stream;
  means for receiving the control stream comprising the second sequence of hash values comprises means for receiving a control stream that includes timestamp information; and
  means for determining when to begin processing received data frames based upon when the first and second sequences of hash values match comprises means for determining when to begin decoding the audio data stream when the timestamp information matches a network clock signal.

26. The wireless communication device of claim 23, wherein:
  the sequence of data frames comprises an audio data stream;
  means for receiving the control stream comprising the second sequence of hash values comprises means for receiving a control stream that includes clock information; and
  means for determining when to begin processing received data frames based upon when the first and second sequences of hash values match comprises means for determining when to begin decoding the audio data stream based upon received clock information and a network clock.

27. The wireless communication device of claim 23, further comprising:
  means for storing the received data frames in a buffer; and
  means for generating a new second sequence of hashes based on most recently received data frames stored in the buffer when the first and second sequences of hash values do not match.

28. The wireless communication device of claim 23, wherein means for applying the hash algorithm to the received data frames comprises means for applying a cyclic redundancy check to the received data frames.

29. The wireless communication device of claim 23, wherein means for applying the hash algorithm to the received data frames comprises means for applying a forward error correction algorithm to the received data frames.

30. The wireless communication device of claim 23, wherein means for comparing the first and second sequences of hash values comprises means for comparing a hash value for each received data frame to determine when there is a match.

31. The wireless communication device of claim 23, wherein means for comparing the first and second sequences of hash values comprises means for comparing a sequence of hash values spanning a plurality of data frames to determine when a pattern of hash values match.

32. The wireless communication device of claim 23, further comprising means for receiving the control stream as part of the first wireless communication link.

33. The wireless communication device of claim 12, further comprising means for receiving the control stream via a second wireless communication link different from the first wireless communication link.

34. A non-transitory processor-readable storage medium having stored thereon processor-executable instructions configured to cause a communication device processor to perform operations comprising:
  receiving a sequence of data frames in a receiver device via a first wireless communication link;
  applying a hash algorithm to the received data frames to generate a first sequence of hash values;
  receiving a control stream comprising a second sequence of hash values;
  comparing the first and second sequences of hash values; and
  determining when to begin processing received data frames based upon when the first and second sequences of hash values match.

35. The non-transitory processor-readable storage medium of claim 34, wherein the stored processor-executable instructions are configured to cause a communication device processor to perform operations such that determining when to begin processing received data frames based upon when the first and second sequences of hash values match comprises beginning to process audio data frames in order to generate sound, and wherein the communication device is one of a plurality of wireless communication devices.

36. The non-transitory processor-readable storage medium of claim 34, wherein the stored processor-executable instructions are configured to cause a communication device processor to perform operations such that:
  the sequence of data frames comprises an audio data stream;
  receiving the control stream comprising the second sequence of hash values comprises receiving a control stream that includes timestamp information; and
  determining when to begin processing received data frames based upon when the first and second sequences of hash values match comprises determining when to begin decoding the audio data stream when the timestamp information matches a network clock signal.

37. The non-transitory processor-readable storage medium of claim 34, wherein the stored processor-executable instructions are configured to cause a communication device processor to perform operations such that:
the sequence of data frames comprises an audio data stream;
receiving the control stream comprising the second sequence of hash values comprises receiving a control stream that includes clock information; and
determining when to begin processing received data frames based upon when the first and second sequences of hash values match comprises determining when to begin decoding the audio data stream based upon received clock information and a network clock.

38. The non-transitory processor-readable storage medium of claim 34, wherein the stored processor-executable instructions are configured to cause a communication device processor to perform operations further comprising:
storing the received data frames in a buffer; and
generating a new second sequence of hashes based on most recently received data frames stored in the buffer when the first and second sequences of hash values do not match.

39. The non-transitory processor-readable storage medium of claim 34, wherein the stored processor-executable instructions are configured to cause a communication device processor to perform operations such that applying the hash algorithm to the received data frames comprises applying a cyclic redundancy check to the received data frames.

40. The non-transitory processor-readable storage medium of claim 34, wherein the stored processor-executable instructions are configured to cause a communication device processor to perform operations such that applying the hash algorithm to the received data frames comprises applying a forward error correction algorithm to the received data frames.

41. The non-transitory processor-readable storage medium of claim 34, wherein the stored processor-executable instructions are configured to cause a communication device processor to perform operations such that comparing the first and second sequences of hash values comprises comparing a hash value for each received data frame to determine when there is a match.

42. The non-transitory processor-readable storage medium of claim 34, wherein the stored processor-executable instructions are configured to cause a communication device processor to perform operations such that comparing the first and second sequences of hash values comprises comparing a sequence of hash values spanning a plurality of data frames to determine when a pattern of hash values match.

43. The non-transitory processor-readable storage medium of claim 34, wherein the stored processor-executable instructions are configured to cause a communication device processor to perform operations such that receiving the control stream comprising the second sequence of hash values comprises receiving the control stream as part of the first wireless communication link.

44. The non-transitory processor-readable storage medium of claim 34, wherein the stored processor-executable instructions are configured to cause a communication device processor to perform operations such that receiving the control stream comprising the second sequence of hash values comprises receiving the control stream via a second wireless communication link different from the first wireless communication link.

45. A method of synchronizing audio data transmitted by a source device to multiple receiver devices, comprising:
encoding audio data into a sequence of data frames;
applying a hash algorithm to each of the data frames to generate a first sequence of hash values;
transmitting the data frames on a first channel;
transmitting the first sequence of hash values on a control channel;
receiving the data frames and the first sequence of hash values in each of the multiple receiver devices;
applying the hash algorithm in each of the multiple receiver devices to the received data frames to generate a second sequence of hash values;
comparing the first and second sequences of hash values in each of the multiple receiver devices; and
beginning to process received data frames in each of the multiple receiver devices when the first and second sequences of hash values match.

46. The method of claim 45, wherein:
the multiple receiver devices comprise first and second speaker devices; and
beginning to process received data frames in each of the multiple receiver devices when the first and second sequences of hash values match comprises beginning to decode the data frames in each of the first and second speaker devices so that audio is generated by the first and second speaker devices that is synchronized within a single 48 KHz sample.

47. The method of claim 45, wherein transmitting the first sequence of hash values on the control channel comprises transmitting the first sequence of hash values on a control channel as part of a wireless communication link that also transmits the first channel.

48. The method of claim 45, wherein transmitting the first sequence of hash values on the control channel comprises transmitting the first sequence of hash values on a control channel via a wireless communication link that is different from the first channel.

49. A communication system, comprising:
a wireless data source device; and
a plurality of receiver devices,
wherein the wireless data source device comprises:
a wireless transceiver; and
a source device processor coupled to the wireless transceiver and configured with processor-executable instructions to perform operations comprising:
encoding audio data into a sequence of data frames;
applying a hash algorithm to each of the data frames to generate a first sequence of hash values;
transmitting the data frames on a first channel, and
transmitting the first sequence of hash values on a control channel;
wherein each of the plurality of receiver devices comprises:
a wireless receiver circuit; and
a receiver device processor coupled to the wireless receiver circuit and configured with processor-executable instructions to perform operations comprising:
receiving the data frames and the first sequence of hash values;
applying the hash algorithm to the received data frames to generate a second sequence of hash values;

comparing the first and second sequences of hash values; and
beginning to process received data frames when the first and second sequences of hash values match.

50. The communication system of claim 49, wherein:
the plurality of receiver devices comprise first and second speaker devices; and
the receiver device processor is configured with processor-executable instructions to perform operations such that beginning to process received data frames in each of the plurality of receiver devices when the first and second sequences of hash values match comprises beginning to decode the data frames in each of the first and second speaker devices so that audio is generated by the first and second speaker devices that is synchronized within a single 48 KHz sample.

51. The communication system of claim 49, wherein the source device processor is configured with processor-executable instructions to perform operations such that transmitting the first sequence of hash values on the control channel comprises transmitting the first sequence of hash values on a control channel as part of a wireless communication link that also transmits the first channel.

52. The communication system of claim 49, wherein the source device processor is configured with processor-executable instructions to perform operations such that transmitting the first sequence of hash values on the control channel comprises transmitting the first sequence of hash values on a control channel via a wireless communication link that is different from the first channel.

53. A communication system, comprising:
a wireless data source device comprising:
means for encoding audio data into a sequence of data frames;
means for applying a hash algorithm to each of the data frames to generate a first sequence of hash values;
means for transmitting the data frames on a first channel, and
means for transmitting the first sequence of hash values on a control channel; and
a plurality of receiver devices, each of the plurality of receiver devices comprising:
means for receiving the data frames and the first sequence of hash values;
means for applying the hash algorithm to the received data frames to generate a second sequence of hash values;
means for comparing the first and second sequences of hash values; and
means for beginning to process received data frames when the first and second sequences of hash values match.

54. The communication system of claim 53, wherein:
the plurality of receiver devices further comprise first and second speaker devices; and
means for beginning to process received data frames in each of the plurality of receiver devices when the first and second sequences of hash values match comprises means for beginning to decode the data frames in each of the first and second speaker devices so that audio is generated by the first and second speaker devices that is synchronized within a single 48 KHz sample.

55. The communication system of claim 53, wherein means for transmitting the first sequence of hash values on a control channel comprises means for transmitting the first sequence of hash values on a control channel as part of a wireless communication link that also transmits the first channel.

56. The communication system of claim 53, wherein means for transmitting the first sequence of hash values on the control channel comprises means for transmitting the first sequence of hash values on a control channel via a wireless communication link that is different from the first channel.

57. A non-transitory processor-readable storage medium having stored thereon processor-executable instructions configured to be executed by a wireless data source device processor and processors of a plurality of wireless receiver devices,
wherein the stored processor-executable instructions configured to be executed by processor of a wireless data source device are configured to cause the processor to perform operations comprising:
encoding audio data into a sequence of data frames;
applying a hash algorithm to each of the data frames to generate a first sequence of hash values;
transmitting the data frames on a first channel, and
transmitting the first sequence of hash values on a control channel, and
wherein the stored processor-executable instructions configured to be executed by processors of the plurality of wireless receiver devices are configured to cause the processor to perform operations comprising:
receiving the data frames and the first sequence of hash values;
applying the hash algorithm to the received data frames to generate a second sequence of hash values;
comparing the first and second sequences of hash values; and
beginning to process received data frames when the first and second sequences of hash values match.

58. The non-transitory processor-readable storage medium of claim 57, wherein the stored processor-executable instructions configured to be executed by processors of the plurality of wireless receiver devices are configured to cause the processor to perform operations such that beginning to process received data frames when the first and second sequences of hash values match comprises beginning to decode the data frames in each of the first and second speaker devices so that audio is generated by the first and second speaker devices that is synchronized within a single 48 KHz sample.

59. The non-transitory processor-readable storage medium of claim 57, wherein the stored processor-executable instructions configured to be executed by a wireless data source device processor are configured to cause the processor to perform operations such that transmitting the first sequence of hash values on the control channel comprises transmitting the first sequence of hash values on a control channel as part of a wireless communication link that also transmits the first channel.

60. The non-transitory processor-readable storage medium of claim 57, wherein the stored processor-executable instructions configured to be executed by a wireless data source device processor are configured to cause the processor to perform operations such that transmitting the first sequence of hash values on the control channel comprises transmitting the first sequence of hash values on a control channel via a wireless communication link that is different from the first channel.

* * * * *